US 11,126,890 B2

(12) United States Patent
Lin et al.

(10) Patent No.: US 11,126,890 B2
(45) Date of Patent: Sep. 21, 2021

(54) ROBUST TRAINING OF LARGE-SCALE OBJECT DETECTORS WITH A NOISY DATASET

(71) Applicant: ADOBE INC., San Jose, CA (US)

(72) Inventors: Zhe Lin, Fremont, CA (US); Mingyang Ling, San Jose, CA (US); Jianming Zhang, Campbell, CA (US); Jason Kuen, Melaka (MY); Federico Perazzi, San Jose, CA (US); Brett Butterfield, San Francisco, CA (US); Baldo Faieta, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 256 days.

(21) Appl. No.: 16/388,115

(22) Filed: Apr. 18, 2019

(65) Prior Publication Data
US 2020/0334501 A1    Oct. 22, 2020

(51) Int. Cl.
*G06K 9/62* (2006.01)
*G06K 9/34* (2006.01)
*G06N 3/08* (2006.01)

(52) U.S. Cl.
CPC .......... *G06K 9/6256* (2013.01); *G06K 9/342* (2013.01); *G06K 9/628* (2013.01); *G06N 3/08* (2013.01)

(58) Field of Classification Search
CPC ...... G06K 9/6256; G06K 9/342; G06K 9/628; G06N 3/08
See application file for complete search history.

(56) References Cited

U.S. PATENT DOCUMENTS

| | | | |
|---|---|---|---|
| 10,297,070 B1* | 5/2019 | Zhu | G06T 17/00 |
| 10,303,980 B1* | 5/2019 | Kim | G06T 7/11 |
| 10,395,108 B1* | 8/2019 | Geng | G06N 3/084 |
| 10,733,431 B2* | 8/2020 | Zhang | G06N 7/00 |
| 10,796,452 B2* | 10/2020 | Vajda | G06N 3/084 |
| 10,922,860 B2* | 2/2021 | Price | G06T 11/00 |
| 2013/0138436 A1* | 5/2013 | Yu | G06N 3/08 |
| | | | 704/232 |

(Continued)

OTHER PUBLICATIONS

Hessam Bagherinezhad et al., "Label Refinery: Improving ImageNet Classification through Label Progression", arXiv preprint arXiv:1805.02641, 2018 (16 pages).

(Continued)

*Primary Examiner* — Mia M Thomas
(74) *Attorney, Agent, or Firm* — F. Chau & Associates, LLC (57) ABSTRACT

Systems and methods are described for object detection within a digital image using a hierarchical softmax function. The method may include applying a first softmax function of a softmax hierarchy on a digital image based on a first set of object classes that are children of a root node of a class hierarchy, then apply a second (and subsequent) softmax functions to the digital image based on a second (and subsequent) set of object classes, where the second (and subsequent) object classes are children nodes of an object class from the first (or parent) object classes. The methods may then include generating an object recognition output using a convolutional neural network (CNN) based at least in part on applying the first and second (and subsequent) softmax functions. In some cases, the hierarchical softmax function is the loss function for the CNN.

20 Claims, 9 Drawing Sheets

(56) References Cited

U.S. PATENT DOCUMENTS

| | | | |
|---|---|---|---|
| 2017/0200077 A1* | 7/2017 | Weston | G06F 40/279 |
| 2017/0243085 A1* | 8/2017 | Vanhoucke | G06N 3/08 |
| 2018/0060649 A1* | 3/2018 | Kastaniotis | G06K 9/00295 |
| 2018/0136912 A1* | 5/2018 | Venkataramani | G06N 3/0454 |
| 2018/0204120 A1* | 7/2018 | Rei | G06N 3/0445 |
| 2018/0330183 A1* | 11/2018 | Tsunoda | G06K 9/46 |
| 2018/0357540 A1* | 12/2018 | Hwang | G06N 3/0472 |
| 2019/0138849 A1* | 5/2019 | Zhang | G06K 9/6215 |
| 2019/0147304 A1* | 5/2019 | Liu | G06K 9/6257 382/157 |
| 2019/0166823 A1* | 6/2019 | Dick | G06K 9/628 |
| 2019/0171870 A1* | 6/2019 | Vajda | G06T 7/75 |
| 2019/0258885 A1* | 8/2019 | Piette | G06K 9/627 |
| 2019/0304069 A1* | 10/2019 | Vogels | G06T 5/50 |
| 2019/0370978 A1* | 12/2019 | Hashimoto | G06T 7/73 |
| 2019/0377949 A1* | 12/2019 | Chen | G06K 9/6267 |
| 2019/0385009 A1* | 12/2019 | Iventosch | G06N 3/0454 |
| 2020/0097739 A1* | 3/2020 | Hashimoto | B60W 30/0956 |
| 2020/0143205 A1* | 5/2020 | Yao | G06K 9/6262 |
| 2020/0175352 A1* | 6/2020 | Cha | G06N 3/0454 |
| 2020/0242451 A1* | 7/2020 | Cao | G06N 3/0454 |
| 2020/0285916 A1* | 9/2020 | Wang | G06F 16/90335 |
| 2020/0304802 A1* | 9/2020 | Habibian | G06K 9/6271 |
| 2020/0340909 A1* | 10/2020 | Ohsaka | G01N 15/1429 |
| 2020/0364910 A1* | 11/2020 | Price | G06T 11/203 |
| 2020/0395099 A1* | 12/2020 | Meyer | G06N 3/088 |
| 2021/0031367 A1* | 2/2021 | Mirzaei | G06T 7/10 |
| 2021/0042573 A1* | 2/2021 | Krishnamoorthy | G06K 9/6256 |
| 2021/0042623 A1* | 2/2021 | Krishnamoorthy | G06F 16/282 |
| 2021/0042626 A1* | 2/2021 | Krishnamoorthy | G06F 17/15 |
| 2021/0050020 A1* | 2/2021 | Li | G10L 17/04 |

OTHER PUBLICATIONS

Mark Everingham, et al. "The PASCAL Visual Object Classes (VOC) Challenge", International Journal of Computer Vision, 88(2):303-338, 2010.

Kaiming He, et al., "Deep Residual Learning for Image Recognition", In Proceedings of the IEEE Conference on Computer Vision and Pattern Recognition, pp. 770-778, 2016.

Geoffrey Hinton, et al., "Distilling the Knowledge in a Neural Nebvork", arXiv preprint arXiv:1503.02531, 2015, 9 pages.

Aline Kuznetsova, et al., "The Open Images Dataset v4: Unified image classification, object detection, and visual relationship detection at scale", arXiv preprint arXiv:1811.00982, 2018, 20 pages.

Tsurig-Yi Lin. et al., Microsoft COCO: Common Objects in Context, In European Conference on Computer Vision, pp. 740-755. Springer, 2014.

Tsung-Yi Lin, et al., "Feature Pyramid Networks for Object Detection", In CVPR, vol. 1, pp. 4, 2017, 9 pages.

We Liu, et al., "SSD: Single Chot MultiBox Detector", In European Conference on Computer Vision, Springer, pp. 21-27, 2016, 17 pages.

Joseph Redman, et al., "You Only Look Once: Unified, Real-Time Object Detection", In Proceedings of the IEEE Conference on Computer Vision and Pattern Recognition, pp. 779-788, 2016 (10 pages).

Shaoging Ren, et al., "Faster R-DNN: Towards Real-Time Object Detection with Region Proposal Networks", IEEE Transactions on Pattern Analysis & Machine Intelligence, (6):1137-1149, 2017, 14 pages.

Yuxin Wu, et al. "Group Normalization", In ECCV, 2018, 10 pages.

* cited by examiner

Original Annotations 605

Missing Annotations 610

ROBUST TRAINING OF LARGE-SCALE OBJECT DETECTORS WITH A NOISY DATASET

BACKGROUND

The following relates generally to object detection, and more specifically to large-scale object detection within a digital image using a dataset with missing, imbalanced, and complex label relationships.

An object detector refers to a neural network trained using an object detection dataset. The object categories considered in these datasets are sometimes relatively small in number, and are free of missing labels or label ambiguity. These datasets are considered small-scale, well-annotated and clean datasets. However, object detectors trained on small-scale, well annotated and clean datasets may not perform well when processing images from outside the dataset.

Thus, for some applications, it may be appropriate to train an object detector with a larger and more complex training set. However, using a larger and more complex training set results in suboptimal results if the training techniques used are the same as the techniques used for smaller and simpler datasets. Large datasets are more likely to include missing labels or complex relationships among the labels, and the training techniques used for small or simple datasets may not be designed to handle such cases. For example, given a large number of label categories, there may be complex hierarchical label relationships between the categories. These complex hierarchical label relationships pose a challenge for object detectors that generally consider only disjoint non-overlapping object categories. In addition, the complex label relationships may also be correlated with object label inconsistencies across images.

Furthermore, as the number of images and categories grow, the class distribution imbalance of the dataset becomes more severe, compared to previous datasets. Many object detection algorithms cannot handle this class distribution imbalance that is present in large number of image and category datasets. Given the large number of categories, it may be difficult to exhaustively annotate all the possible object categories, resulting in missing box annotations in the dataset. Therefore, there is a need in the art for object detectors and techniques for training object detectors that are suitable for use with large, complex training datasets.

SUMMARY

A method for object detection within a digital image using a hierarchical softmax function is described. The method applies a first softmax function of a softmax hierarchy on a digital image based on a first plurality of object classes, wherein the first plurality of object classes are children of a root node of a class hierarchy, apply a second softmax function of the softmax hierarchy to the digital image based on a second plurality of object classes, wherein the second plurality of object classes comprise children nodes of an object class from the first plurality of object classes, and generate an object recognition output using a convolutional neural network (CNN) based at least in part on applying the first softmax function and the second softmax function.

An apparatus for object detection within a digital image using a hierarchical softmax function is described. The apparatus includes a processor, memory in electronic communication with the processor, and instructions stored in the memory. The instructions are operable to cause the processor to receive an output vector from a layer of a CNN; apply a first softmax function of a softmax hierarchy to a first subset of the values from the output vector, wherein the first subset of values corresponds to a first plurality of object classes that are children of a root node of a class hierarchy; apply a second softmax function of the softmax hierarchy to a second subset of the values from the output vector, wherein the second subset of values corresponds to a second plurality of object classes that are children nodes of an object class from the first plurality of object classes; apply one or more third softmax functions of the softmax hierarchy to one or more third subsets of the values from the output vector, wherein the one or more third subsets of values correspond to one or more third plurality of object classes that are below the second plurality of object classes in the class hierarchy; produce a loss value for the CNN based at least in part on applying the first softmax function, the second softmax function, and the one or more third softmax functions; and train the CNN based at least in part on the loss value.

A non-transitory computer readable medium storing code for object detection within a digital image using a hierarchical softmax function is described. In some examples, the code comprises instructions executable by a processor to: perform a class level balancing operation on one or more class-specific image sets to generate one or more class-balanced image sets; sample a first plurality of images from the one or more class-balanced image sets to perform a first training epoch; modify one or more sampling weights of the one or more class-balanced image sets to produce one or more modified class-balanced image sets; sample a second plurality of images from the one or more modified class-balanced image sets to perform a second training epoch; apply a hierarchy of softmax functions within a CNN, wherein each softmax function within the hierarchy of softmax functions corresponds to a group of labels in a class hierarchy; and train the CNN based at least in part on the hierarchy of softmax functions, wherein the hierarchy of softmax functions comprises a loss function of the CNN.

DETAILED DESCRIPTION

The present disclosure relates to performing object detection on a digital image using an object detector that incorporates a hierarchical softmax function. The description set forth below is intended as a description of various embodiments and is not intended to represent the only configurations in which the subject matter of this disclosure can be practiced. It will be clear and apparent that the subject matter of this disclosure is not limited to the specific details set forth herein. In some instances, structures and components are shown in block diagram form to avoid obscuring the concepts of the subject matter of this disclosure.

Conventional systems and techniques for training an object detector often assume that training will be done using a relatively small-scale, well annotated and clean dataset. Such an object detector will not perform well if trained on a large, complex dataset. For example, conventional systems and techniques may not be suitable for training with a training dataset that includes: (1) hierarchical label relationships; (2) class distribution imbalances; and (3) missing annotations.

When a training set includes complex label relationships (i.e., a class hierarchy), an object detector that assumes that the class labels are arranged in a single, mutually exclusive sample space is unsuitable. Specifically, a loss function of a convolutional neural network (CNN) may operate in a manner that assumes a simple relationship among the class labels. A softmax function is an example of a loss function that depends on the assumption that the input values (corresponding to a set of class labels) are mutually exclusive, and that the sum of the probabilities is equal to 1. These assumptions may not apply to a complex class hierarchy, and therefore applying such a loss function to a training set with a complex class hierarchy may cause suboptimal results.

Therefore, embodiments of the present disclosure are directed toward systems and methods for training and applying an object detector that is designed to handle a large, complex training set. In at least one embodiment, a method is described for applying a hierarchical softmax function that includes a plurality of component softmax functions corresponding to subgroups within a class hierarchy. The hierarchical softmax function may be used as the loss function of a CNN trained as an object detector, which enables the object detector to make use of the hierarchical relationships among the labels to improve performance.

Therefore, compared to existing object detection algorithms, the present disclosure describes systems and methods that enable an object detector to be trained more effectively and accurately. For example, the use of a hierarchical softmax function according to a method of the present disclosure tracks hierarchical relationships among labels that tend to cause label inconsistencies. A class balancing method according to the present disclosure rebalances the class distribution imbalance that tend to exist in datasets having a large number of categories across a large number of images. Further, a knowledge distillation method according to the present disclosure recovers missing object annotations in the dataset.

A class hierarchy includes one or more groups of labels, where the labels within each group are mutually exclusive, but each label may also have child nodes representing subcategories (i.e., a first group might include "vehicle," "building," and "person" whereas the "person" label may have sublabels such as "man" and "woman"). The softmax functions are applied separately to each label group (that is, instead of applying a single softmax function to the entire set of labels).

The output of each softmax function includes a set of numbers that correspond to the likelihood that an object represents each label in the group. The output of a softmax function sums to 1 (i.e., representing an assumption that the probability of the object corresponding to a label in the group is equal to 1, or in other words, that the labels comprise a complete sample space). Since softmax functions depend on the alternatives being mutually exclusive, applying a single softmax to a hierarchical set of labels is inappropriate because an object can be described by more than one label.

Therefore, a simple softmax function may be inapplicable when training an object detector with training set that includes a hierarchy of labels. However, using a hierarchical softmax function, where individual softmax functions are applied based on the label hierarchy, enables efficient training of an object detector on such complex training sets.

In addition to using a hierarchical softmax function, embodiments of the present disclosure employ a class balancing process to address label imbalances within the training set. For example, a training set may have many images that include objects labeled with "vehicle" and few objects labeled "person". A class balancing process according to the present disclosure includes sampling a first plurality of images from a class-balanced image sets to perform a first training epoch, modifying one or more sampling weights of the one or more class-balanced image sets, repeating the sampling and modifying for a second plurality of images to perform a second training epoch, wherein the digital image is selected based on sampling the first plurality of images or the second plurality of images. Class balancing may be applied both offline (i.e., prior to training) and online (i.e., in between training epochs).

Therefore, an object detector based on the present disclosure will be more accurate in detecting a wide range of object imbalances in the training set that will be corrected prior to (and during) the training process.

Additionally, missing annotations in the training set may be recovered by training an initial object detector, applying the object detector to the images in the training set, and then using the revised training images to update the object detector.

Thus, embodiments of the present disclosure address problems encountered with using training datasets that include complex relationships among the labels, imbalanced class distributions, and missing annotations.

Figure 1:
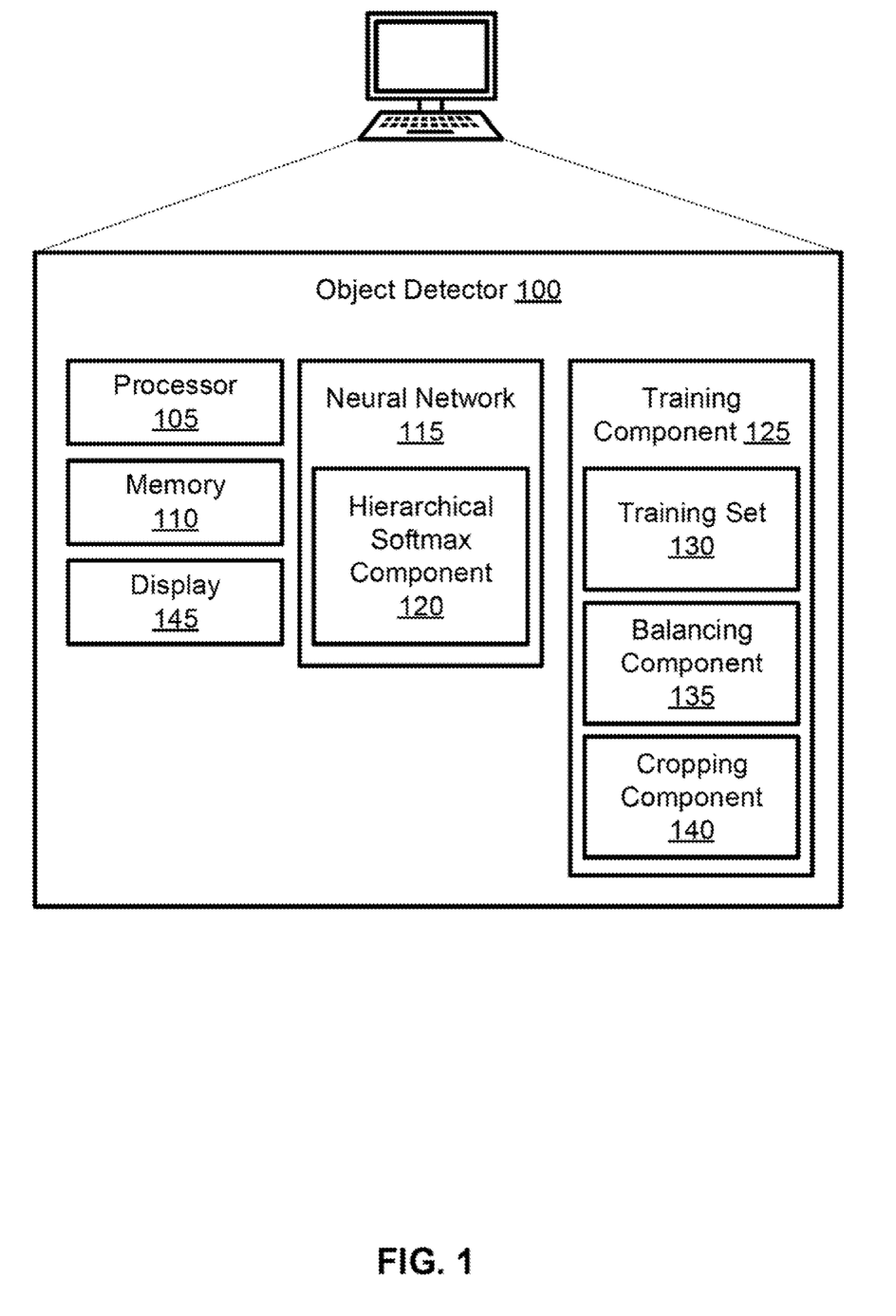
FIG. 1 shows an example of an object detector in accordance with aspects of the present disclosure.

FIG. 1 shows an example of an object detector 100 in accordance with aspects of the present disclosure. Object detector 100 includes processor 105, memory 110, neural network 115, training component 125, and, in some cases, a display 145.

In some examples, object detector 100 may be a computing device such as a personal computer, laptop computer, mainframe computer, palmtop computer, personal assistant, mobile device, or any other suitable processing apparatus. In some cases, object detector 100 is a computing device connected to an online network (not shown).

A processor 105 may include an intelligent hardware device, (e.g., a general-purpose processing component, a digital signal processor (DSP), an application specific integrated circuit (ASIC), a field programmable gate array (FPGA), a programmable logic device, a discrete gate or transistor logic component, a discrete hardware component, or any combination thereof). In some cases, the processor 105 may be configured to operate a memory array using a memory controller. In other cases, a memory controller may be integrated into processor. The processor 105 is configured to execute computer-readable instructions stored in a memory to perform various functions.

Memory 110 may include random access memory (RAM), read only memory (ROM), or a hard disk. The memory 110 may be solid state or a hard disk drive, and may include store computer-readable, computer-executable software including instructions that, when executed, cause a processor 105 to perform various functions described herein. In some cases, the memory 110 may contain, among other things, a BIOS which may control basic hardware or software operation such as the interaction with peripheral components or devices. In some cases, a memory controller may operate memory cells as described herein. In some cases, memory controller may include a row decoder, column decoder, or both. In some cases, memory cells within a memory may store information in the form of a logical state.

In some embodiments, object detector 100 utilizes an artificial neural network (ANN) to recognize objects in digital images. An ANN is a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal can process it and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). As described herein, the loss function may be based on a hierarchical softmax. The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

A convolutional neural network (CNN) is a class of neural network that is commonly used in computer vision or image classification systems. CNNs may enable processing of digital images with minimal preprocessing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input (i.e., to label an object included in a class hierarchy).

Certain embodiments of the present disclosure use a Faster region-based convolutional neural network (Faster R-CNN). It may be appreciated that Faster R-CNN may also be successfully applied to small-scale detection datasets. A Faster R-CNN may include two major "head" networks: a Region Proposal Network (RPN), which predicts class-agnostic region proposals given some predefined anchor boxes, and box-level class-specific classification and regression head.

In certain embodiments of the present disclosure, the baseline detector uses a softmax cross-entropy loss function for classification, and class-specific weights for bounding box regression. To better utilize multi-scale contextual information, certain embodiments incorporate a Feature Pyramid Network (FPN) to the detector backbone for effective feature aggregation across different feature map scales. In certain embodiments of the present disclosure, the detection network further includes ResNet (e.g., ResNet 101) and Group Normalization as the backbone network for a Faster R-CNN.

Object detector 100 generates an object recognition output using a CNN based at least in part on applying a first softmax function and a second softmax function (i.e., a softmax hierarchy that includes at least two levels). In some examples, the CNN comprises a loss function based on the softmax hierarchy (i.e., for training the CNN). Object detector 100 may also identify an object in the digital image based on the object recognition output, wherein the object corresponds to at least one class from the class hierarchy.

Neural network 115 includes hierarchical softmax component 120. Hierarchical softmax component 120 applies a first softmax function of a softmax hierarchy on a digital image (i.e., to a first subset of values of an output vector of an internal layer of a CNN processing the digital image) based on a first plurality of object classes, wherein the first plurality of object classes are children of a root node of a class hierarchy. Hierarchical softmax component 120 also applies a second softmax function of the softmax hierarchy to the digital image (i.e., to a second subset of values of the output vector) based on a second plurality of object classes, wherein the second plurality of object classes comprise children nodes of an object class from the first plurality of object classes. In other words hierarchical softmax component 120 applies a softmax hierarchy (i.e., as a loss function of a neural network).

In some cases, hierarchical softmax component 120 may also apply one or more third softmax functions of the softmax hierarchy (i.e., to a third subset of values of the output vector), wherein the one or more third softmax functions correspond to one or more third plurality of object classes below the second plurality of object classes in the class hierarchy. Hierarchical softmax component 120 may also perform an averaging on a result of the first softmax function and a result of the second softmax function, wherein the result of the first softmax function has a higher weight in the averaging function than the result of the second softmax function.

A softmax function is a normalized exponential function that takes a vector of real numbers as input and produces a normalized probability distribution. Prior to applying a softmax function, the components of the input vector may be negative, and they may not sum to 1. However, after applying softmax, each component of the output vector will be between 0 and 1 and they will sum to 1. The components of the output can be interpreted as probabilities on a sample space. In some cases, a softmax function may be monotonic. That is, larger input components may correspond to larger output components.

Training component 125 identifies a training set 130 for the CNN. Training component 125 may also select the digital image from the training set 130, wherein the first softmax function and the second softmax function are applied based on the selection. Training component 125 may also train the CNN based at least in part on the object recognition output. Training component 125 may also identify one or more missing object boxes based at least in part on the object recognition output, wherein training the CNN is based at least in part on the one or more missing object boxes.

In some cases, training component 125 may determine that the training set 130 comprises a complex training set based on one or more complexity factors from a set of complexity factors comprising: a label hierarchy factor, a label imbalance factor, a training set size factor, and a missing label factor, wherein the softmax hierarchy is applied based at least in part on the one or more complexity factors. Training component 125 may include training set 130, balancing component 135, and cropping component 140.

Balancing component 135 identifies one or more class-specific image sets from the training set 130. Balancing component 135 may also perform a class level balancing operation on the one or more class-specific image sets to generate one or more class-balanced image sets. Balancing component 135 may also sample a first plurality of images from the one or more class-balanced image sets to perform a first training epoch. Balancing component 135 may also modify one or more sampling weights of the one or more class-balanced image sets to produce one or more modified class-balanced image sets. Balancing component 135 may also sample a second plurality of images from the one or more modified class-balanced image sets to perform a second training epoch, wherein the digital image is selected based on sampling the first plurality of images or the second plurality of images.

Cropping component 140 identifies one or more object boxes in the digital image. Cropping component 140 may also perform a random cropping of the digital image based at least in part on the one or more identified object boxes, wherein the CNN is trained based at least in part on the random cropping.

Display 145 may display the digital image along with one or more object overlays based at least in part on the object recognition output. A display 145 may comprise a conventional monitor, a monitor coupled with an integrated display, an integrated display (e.g., an LCD display), or other means for viewing associated data or processing information. Output devices other than the display can be used, such as printers, other computers or data storage devices, and computer networks.

Figure 2:
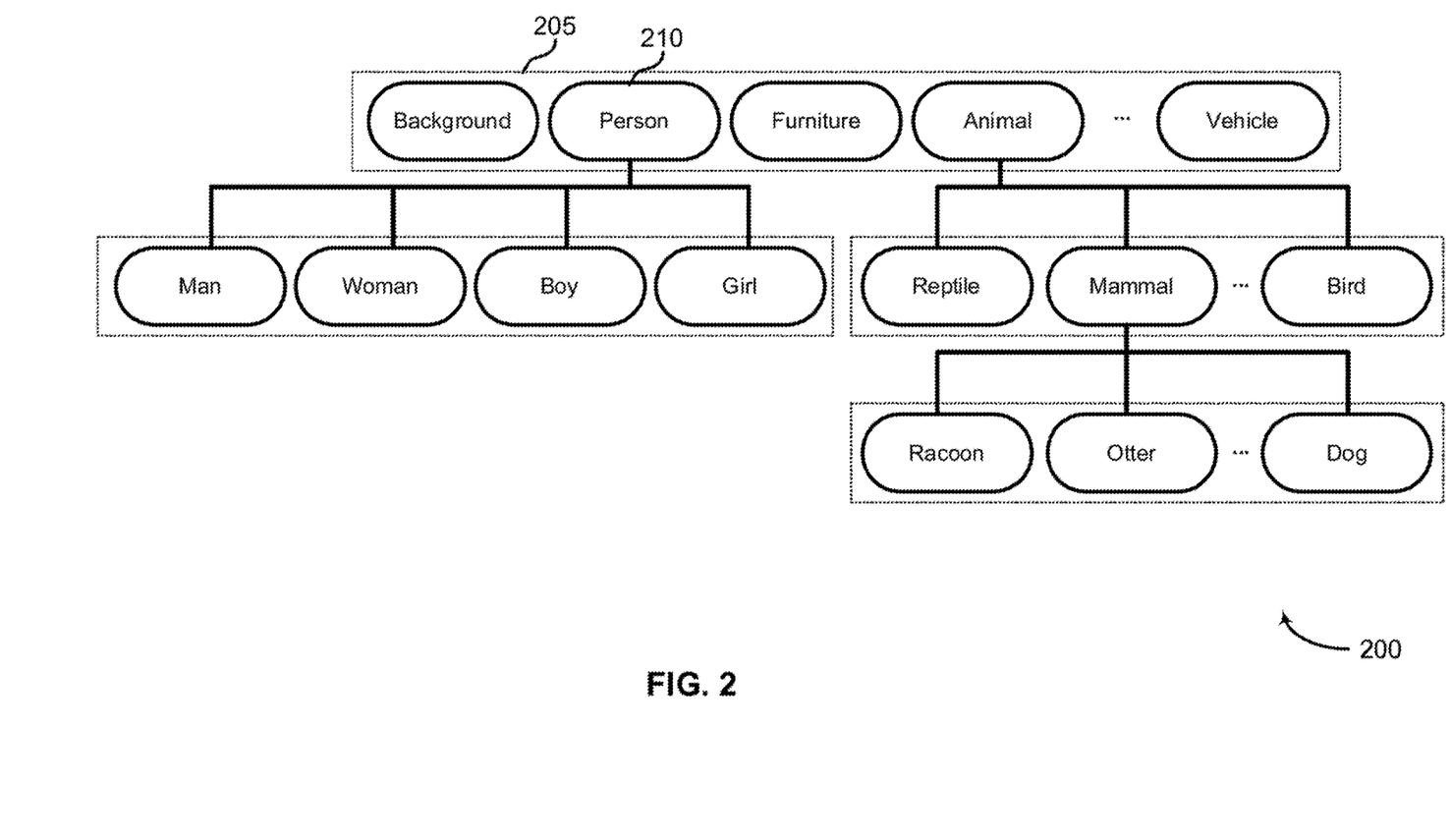
FIG. 2 shows an example of a class hierarchy in accordance with aspects of the present disclosure.

FIG. 2 shows an example of a class hierarchy 200 in accordance with aspects of the present disclosure. Class hierarchy 200 includes class groups 205 and object classes 210. The class hierarchy 200 represents one aspect of complexity that may exist in the class labels of a large or complex dataset.

It may be appreciated that object classes 210 (which may also be referred to as class labels) of a training set may be hierarchically related and the corresponding hierarchy tree is be provided with the dataset. For each child object class 210 in the training annotations, the parent object class 210 (immediate and distant) are accepted at different hierarchy levels as true training labels. In the present illustrated case, if the object class 210 is "Otter", its parent classes "Mammal" and "Animal" are also considered as true. In some cases, the classes within each class group 205 are mutually exclusive (i.e., only one of "Person" and "Vehicle" may be true). Thus, each class group 205 may be considered separately (i.e., with a separate softmax function).

FIG. 2 is provided as an example of an illustration of a set of object classes 210 that form the basis for application of a hierarchical softmax function. A hierarchical softmax provides independent softmax functions that are applied to different softmax groups (i.e., class groups 205) in the class hierarchy 200. Only a subset of the full object classes is shown. In some examples, cross entropy (XE) classification loss paired with a softmax activation function operates based on the assumption that the object classes 210 are disjoint and the class hierarchy 200 is flat. However, as illustrated in FIG. 2, in some cases the class hierarchy 200 includes multiple levels.

Let K be the number of object classes 210 in a class group 205, then the softmax activation on a class's logit $x_i$ is defined as:

$$softmax(x_i) = \frac{e^{x_i}}{\sum_{j=1}^{K} e^{x_j}} \quad (1)$$

It will be appreciated that it may not be appropriate to apply this equation across an entire class hierarchy 200 when the object classes 210 have disjoint hierarchical relationships, because it creates competition among the related object classes 210 that could be simultaneously labeled as true (i.e., between "Animal" and "Mammal").

Thus, in certain embodiments of the present disclosure, the traditional softmax is extended to a "hierarchical softmax," to take the rich structure of the class hierarchy 200 into account. In hierarchical softmax, the softmax activation function is applied to each softmax group (i.e., class groups 205) independently. The object classes 210 in the same class group 205 may share the same level and branch in the hierarchy tree of the class hierarchy 200. If there are N number of class groups 205, indicated by $G_{1,2,\ldots,N}$, hierarchical softmax may be performed as follows:

$$softmax(x_{G_n}) = \frac{e^{x_{G_n}}}{\sum_{x \in G_n} e^x} \text{ for } n = 1, 2, \ldots, N \quad (2)$$

After all the softmax functions have been applied to each class groups 205, XE losses for the classes which are labeled true may be calculated (i.e., for training purposes).

When using a "flat" softmax, XE losses may be averaged to a scalar-valued loss by dividing the summed losses by the number of training samples (e.g., the bounding boxes in a set of images). In certain embodiments of the present disclosure, many softmax groups are considered. An averaging option may then be performed, where averaging is performed within individual softmax groups (i.e., class groups 205) before globally averaging them across all class groups 205.

Figure 3:
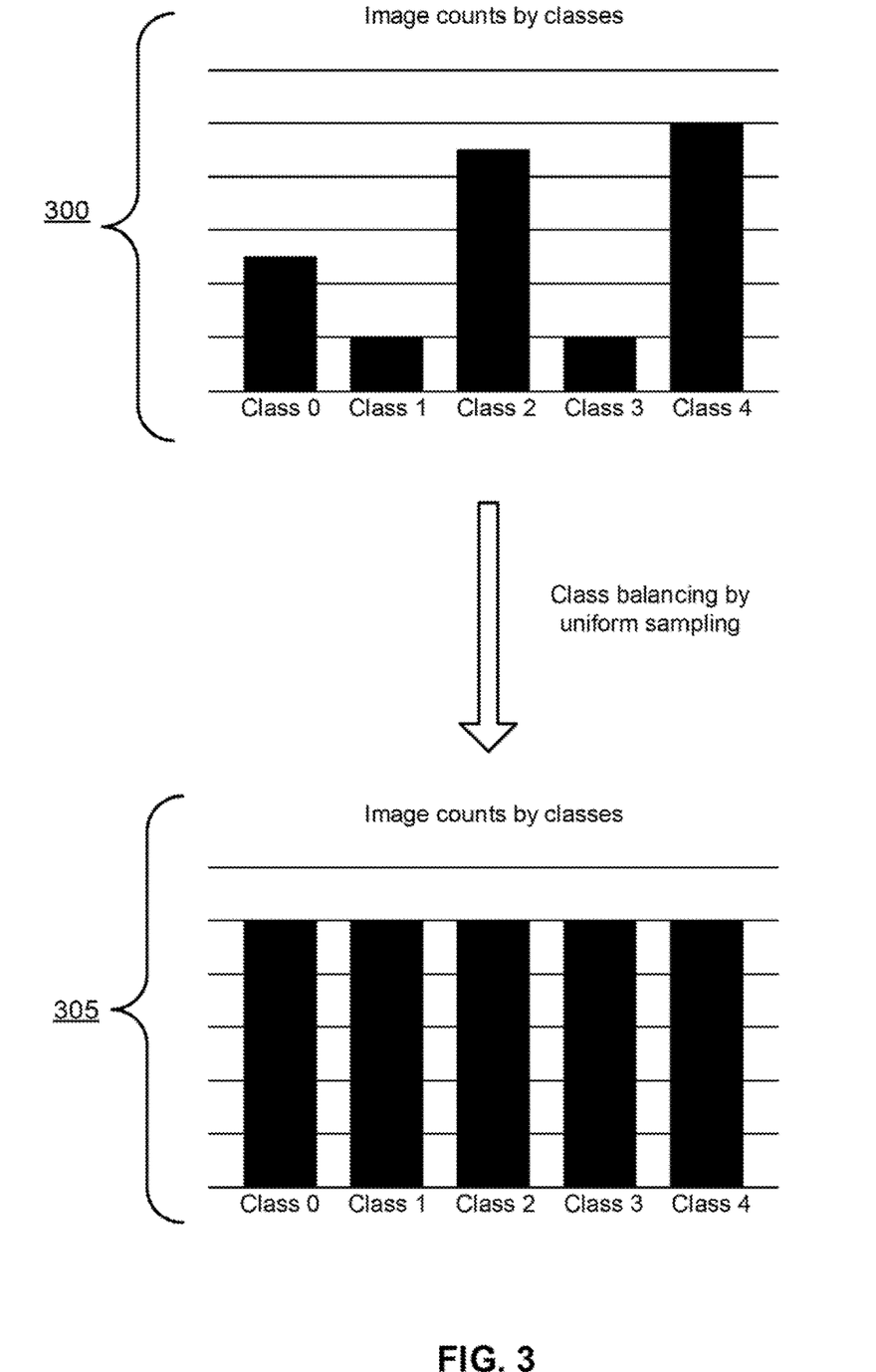
FIG. 3 shows an example of offline class balancing in accordance with aspects of the present disclosure.

Alternatively, the summed losses may be divided by the number of loss instances, whereby each assigned true class label corresponds to a loss instance. It will be appreciated that, if root/parent object classes 210 are more common, this approach may provide more emphasis to those object classes 210 and may encourages more conservative predictions. In other words, this method facilitates prediction of object classes 210 closer to the hierarchy root. FIG. 3 shows an example of offline class balancing in accordance with aspects of the present disclosure. The example shown includes unbalanced image set 300 and balanced image set 305. "Offline" balancing may refer to balancing that occurs prior to initiating a training epoch.

In some datasets, the ratio of occurrence of the most common to the least common object class may be one or more orders of magnitude larger than that of simple dataset. Thus, certain embodiments of the present disclosure include performing offline oversampling of the images containing the rare classes to balance the class distribution to create a balanced training set.

For example, if an object class is relatively rare (e.g., class 1), class balancing may be performed by selecting a proportionately higher number of images from an initial dataset that include objects from class 1, so that in the initial training set, the same number of objects are represented from each object class.

Figure 4:
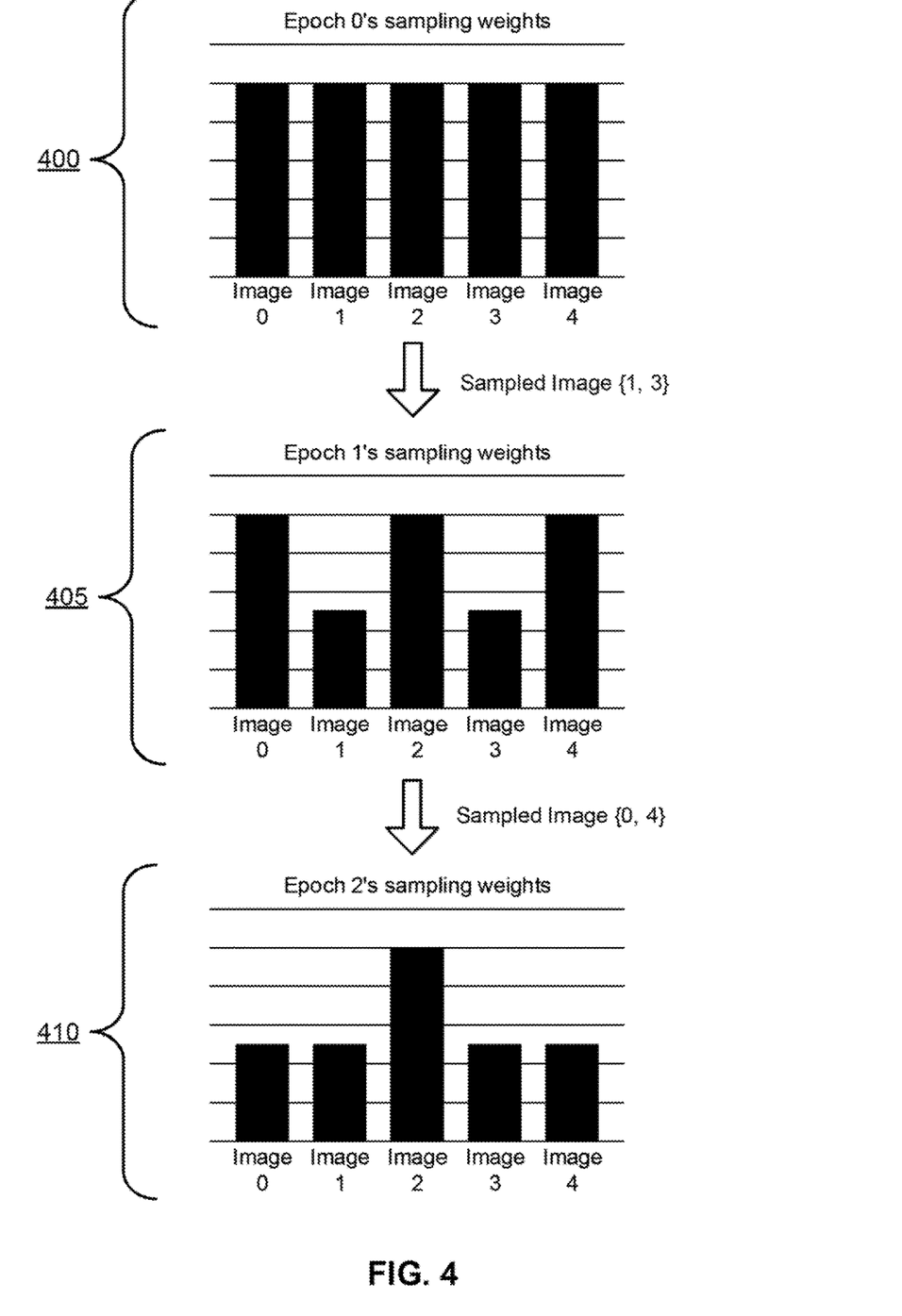
FIG. 4 shows an example of online class balancing in accordance with aspects of the present disclosure.

FIG. 4 shows an example of online class balancing in accordance with aspects of the present disclosure. The example shown includes first sampling weights 400, second sampling weights 405, and third sampling weights 410. "Online" class balancing occurs during training of the neural network.

The column-wise bars correspond to the sampling weights of individual training images. The arrows pointing downward correspond to the sampling process. After each sampling, one or more sampling weights may be modified to ensure balanced samples between epochs. For example, after Image 1 and 3 have been sampled in Epoch 0 based on first sampling weights 400, their sampling weights may be reduced to generate second sampling weights 405 before sampling takes place in Epoch 1. Similarly, the sampling weights for Images 0 and 4 may be modified after these images are sampled in Epoch 1, to create third sampling weights 410.

Certain embodiments of the present disclosure utilize an online method for class-balanced sampling. The online method for class-balanced sampling may be adapted from offline class-balanced sampling but may be performed before the start of every training epoch. For each training epoch, $M_{median}$ number of images per object class may be sampled, where $M_{median}$ is the median number of training images of all individual classes. The images for each class may be recorded separately in class image sets for ease of sampling.

It will be appreciated that some images may be present in one or more class image sets. Within each class image set, sampling of training images may be performed based on sampling weights. Sampling based on sampling weights may allow for rarer images or object classes to be sampled with higher sampling weights. In certain embodiments of the present disclosure, balancing may be carried out at two levels (i.e., class-level and image-level). Combining class-level and image-level balancing may provide enhanced training data diversity.

Figure 5:
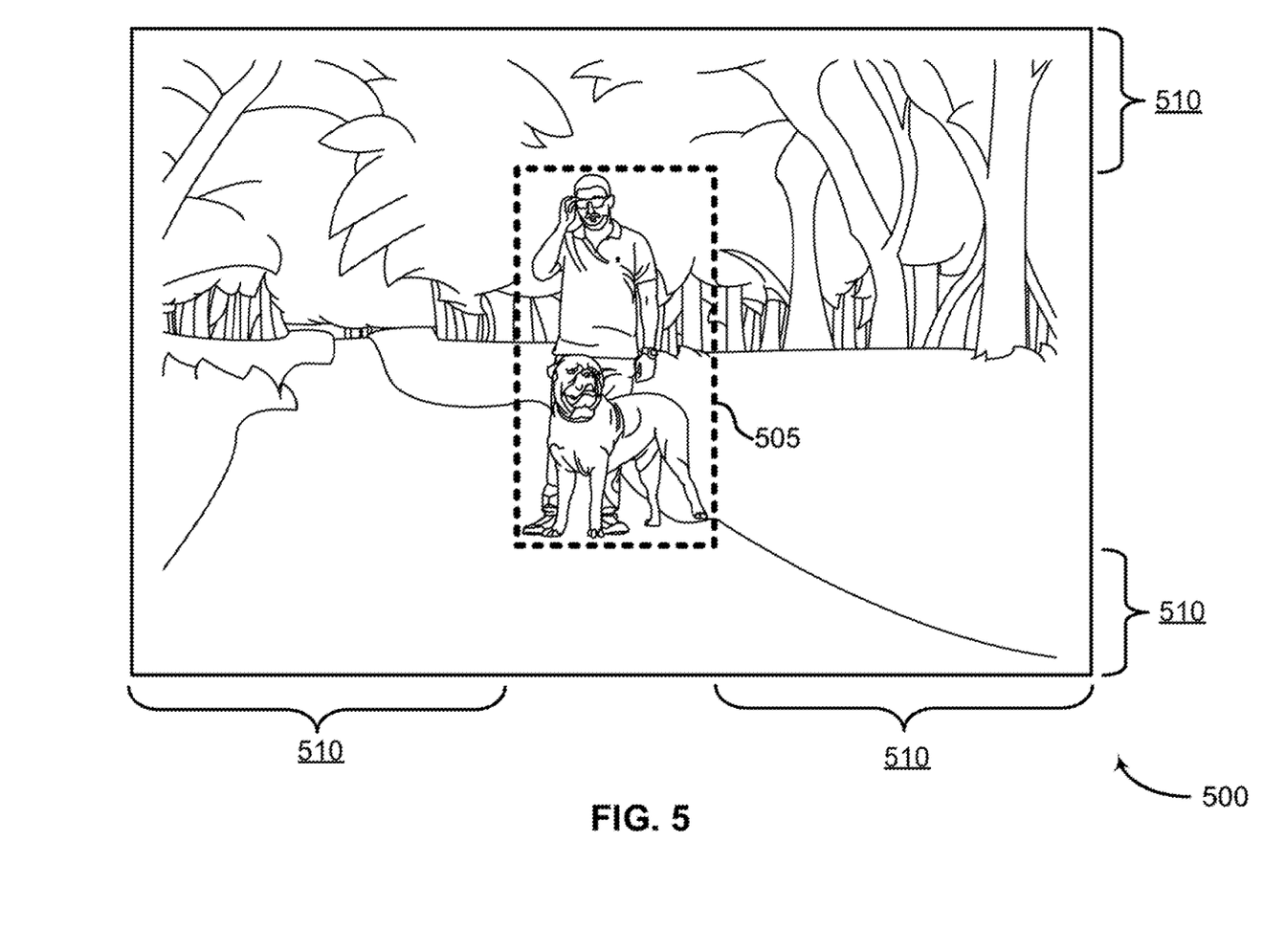
FIG. 5 shows an example of random cropping in accordance with aspects of the present disclosure.

FIG. 5 shows an example of random cropping in accordance with aspects of the present disclosure. The example shown includes image 500, bounding box 505, and valid cropping points 510. Random cropping is used to enhance a training data set by generating multiple diverse images from a single image. The bounding box 505 represents the smallest box that includes the objects corresponding to object classes in the object detector. The valid cropping points represent the set of points outside the bounding box 505 that are selected for cropping the image 500.

In some examples, class balancing (as described in FIGS. 3 and 4) results in reduced sampling diversity. Low data diversity may result from oversampling or repeating training images of rare object classes. Therefore, data augmentation techniques such as horizontal flipping of images may be used to increase the level of diversity. Random cropping may be used in addition to or as an alternative to these image modification techniques.

Thus, the training images may be randomly cropped when constructing per-epoch datasets (e.g., using the online class-balanced sampling method described above with reference to FIG. 4). The cropping points may be randomly selected with a restriction, where the restriction cannot change the box dimensions of the bounding box 505 nor remove the bounding box 505. In some cases, there are multiple objects within the bounding box 505 (i.e., one corresponding to the man and one corresponding to the dog). Each annotated object may have its own box, and the bounding box 505 may be the smallest box that includes the annotated boxes for relevant objects in the image 500. In other words, the cropping points may be selected from the set of valid cropping points 510.

Figure 6:
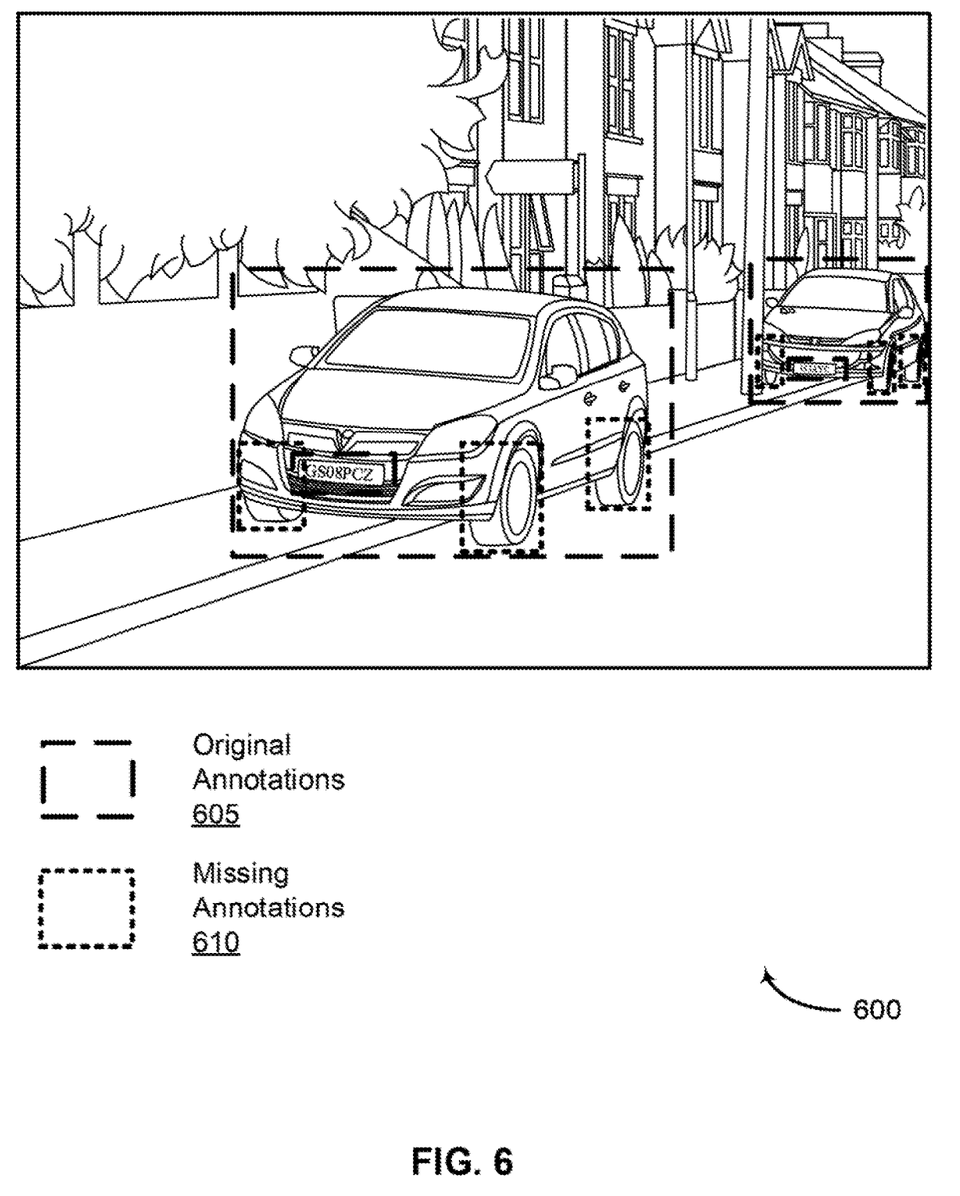
FIG. 6 shows an example of a distillation technique for recovering missing annotations in accordance with aspects of the present disclosure.

FIG. 6 shows an example of a distillation technique for recovering missing annotations 610 in accordance with aspects of the present disclosure. Image 600 includes original annotations 605 and missing annotations 610. Once identified, the missing annotations 610 may be used for further training of an object detector.

In some cases, the original annotations 605 or "ground-truth" bounding boxes in a training dataset are sparsely-annotated. For example as shown in FIG. 6, the cars are annotated with original annotations 605, but the wheels are not annotated. In some embodiments, the missing annotations may be assigned background (or negative) training labels. However, this may give rise to conflicting classification losses.

Thus, certain embodiments of the present disclosure include knowledge distillation methods capable of recovering the missing annotations 610 and using them for further training. For example, certain embodiments of the present disclosure include methods for recovering annotations not originally provided with a training data set.

According to this embodiment, a first training step includes training a detector with the original annotations 605 to produce a first trained detector. Then, the trained detector is applied to one or more validation images (not shown) to find appropriate detection score thresholds given the validation ground-truth annotations. Next, using the found detection thresholds, the trained detector is applied again to the training images to detect the missing annotations 610. Finally, a second detector is trained on the new training data with both the original annotations 605 and missing annotations 610 to produce a second trained detector. Thus, the knowledge is "distilled" from the initial detector to the new detector.

Figure 7:
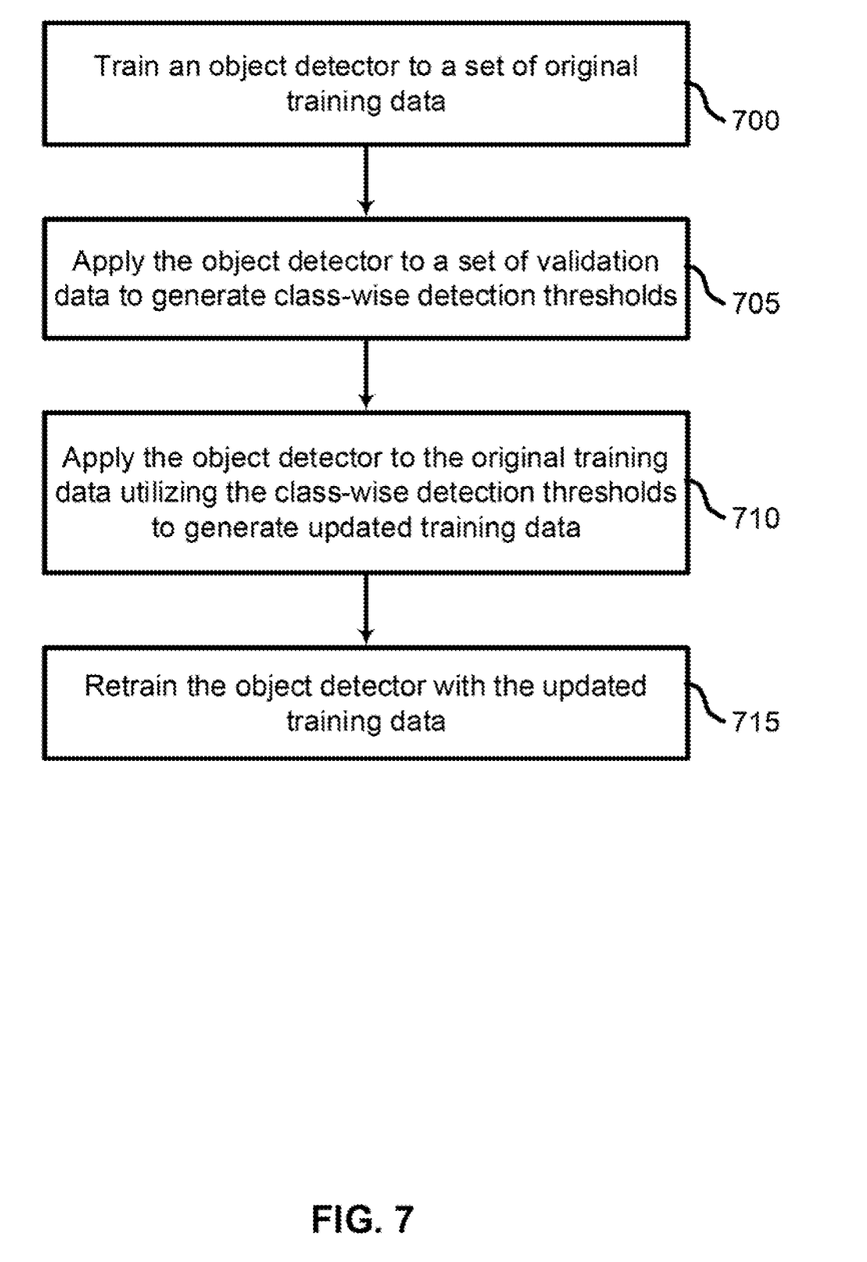
FIG. 7 shows an example of a process for training an object detector using recovered annotations in accordance with aspects of the present disclosure.

FIG. 7 shows an example of a process for training an object detector using recovered annotations in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 700, the system trains an object detector to a set of original training data. In some cases, the operations of this step may refer to, or be performed by, an object detector as described with reference to FIG. 1. Thus, in a first step, the original training data (in some cases, with missing boxes) is placed through a first detector for training.

At step 705, the system applies the object detector to a set of validation data to generate class-wise detection thresholds. In a second step, the validation data is placed through the trained first detector to find detection thresholds. The output of the second step may be class-wise detection score thresholds.

At step 710, the system applies the object detector to the original training data utilizing the class-wise detection thresholds to generate updated training data. In the third step, the original training data (with the annotations still missing) may be placed through the first detector for relabeling purposes. The output of the third step is training data with recovered boxes.

At step 715, the system retrains the object detector with the updated training data. For example, the training data with recovered boxes is used to train a second detector.

Figure 8:
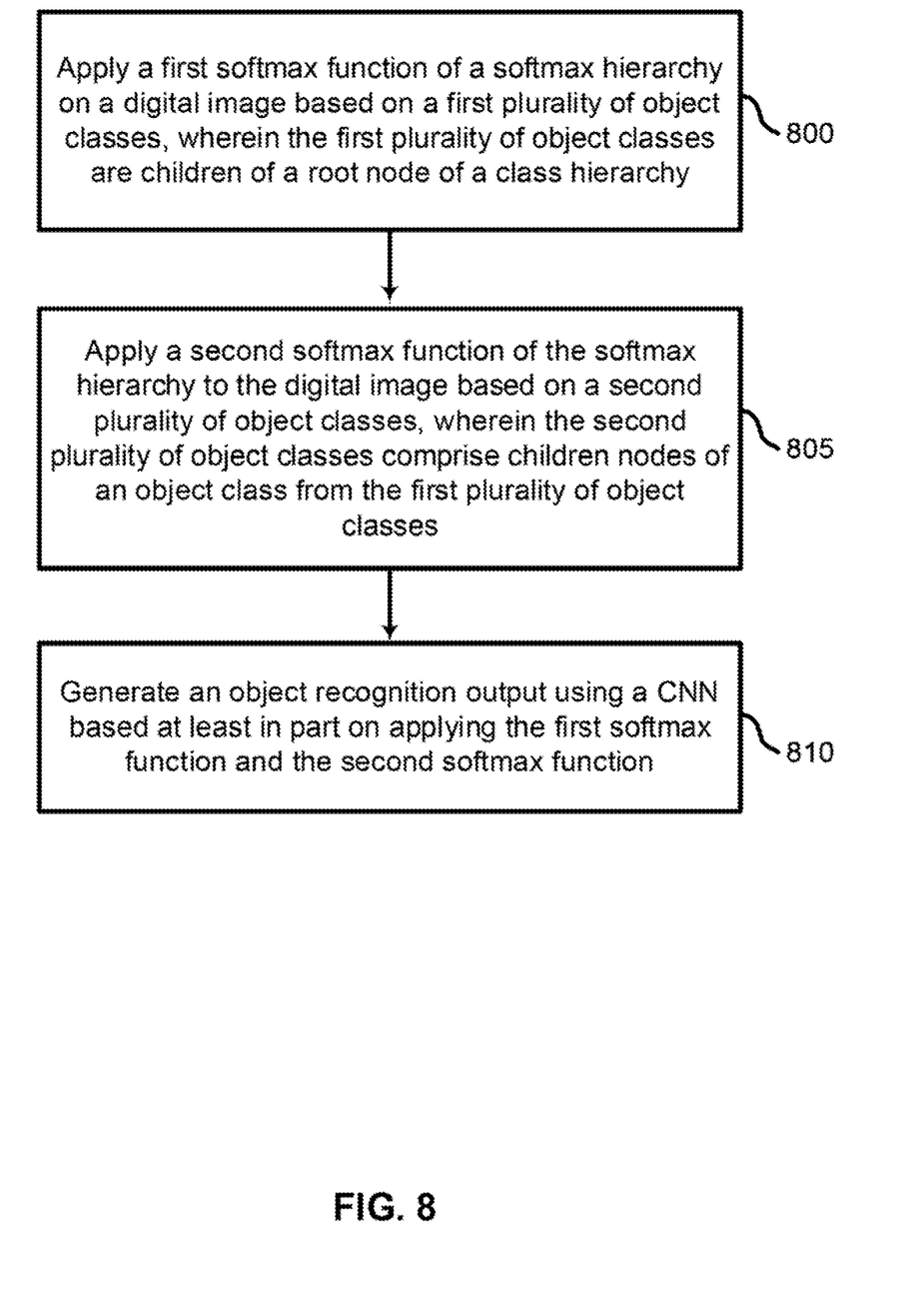
FIGS. 8 through 9 show examples of a process for object detection within a digital image using a hierarchical softmax function in accordance with aspects of the present disclosure.

FIG. 8 shows an example of a process for object detection within a digital image using a hierarchical softmax function in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 800, the system applies a first softmax function of a softmax hierarchy on a digital image based on a first plurality of object classes, wherein the first plurality of object classes are children of a root node of a class hierarchy. In some cases, the operations of this step may refer to, or be performed by, a hierarchical softmax component as described with reference to FIG. 1, and may be performed according to the processes described above with reference to FIG. 2. For example, the first softmax function may be applied based on a set of mutually exclusive object classes at a first level of a class hierarchy (e.g., "background", "person", "furniture", "animal" . . . "vehicle" from FIG. 2).

At step 805, the system applies a second softmax function of the softmax hierarchy to the digital image based on a second plurality of object classes, wherein the second plurality of object classes comprise children nodes of an object class from the first plurality of object classes. In some cases, the operations of this step may refer to, or be performed by, a hierarchical softmax component as described with reference to FIG. 1, and may be performed according to the processes described above with reference to FIG. 2.

For example, the second softmax function may be applied to the group of object classes at a second level of the class hierarchy below the first level (e.g., "reptile". "mammal" . . . and "bird" from FIG. 2). By limiting the first softmax function to the first group of object classes and the second softmax to the second group of object classes, the system may take advantage of the complexity of the relationships between the classes within the hierarchy. For example, since the first group of classes are mutually exclusive, if an object is recognized as an "animal", it can be one of the second group, but not, for example, a "bicycle".

At step 810, the system generates an object recognition output using a CNN based at least in part on applying the first softmax function and the second softmax function. In some cases, the operations of this step may refer to, or be performed by, an object detector as described with reference to FIG. 1. In some examples, the object recognition output may be used for training purposes (i.e., to calculate a loss during a training epoch). In some cases, class-level balancing, image-level balancing, random cropping, and missing annotations may be used to further improve the training of the CNN. Once trained, the CNN may then be used to recognize the objects represented in the class hierarchy from a digital image.

Figure 9:
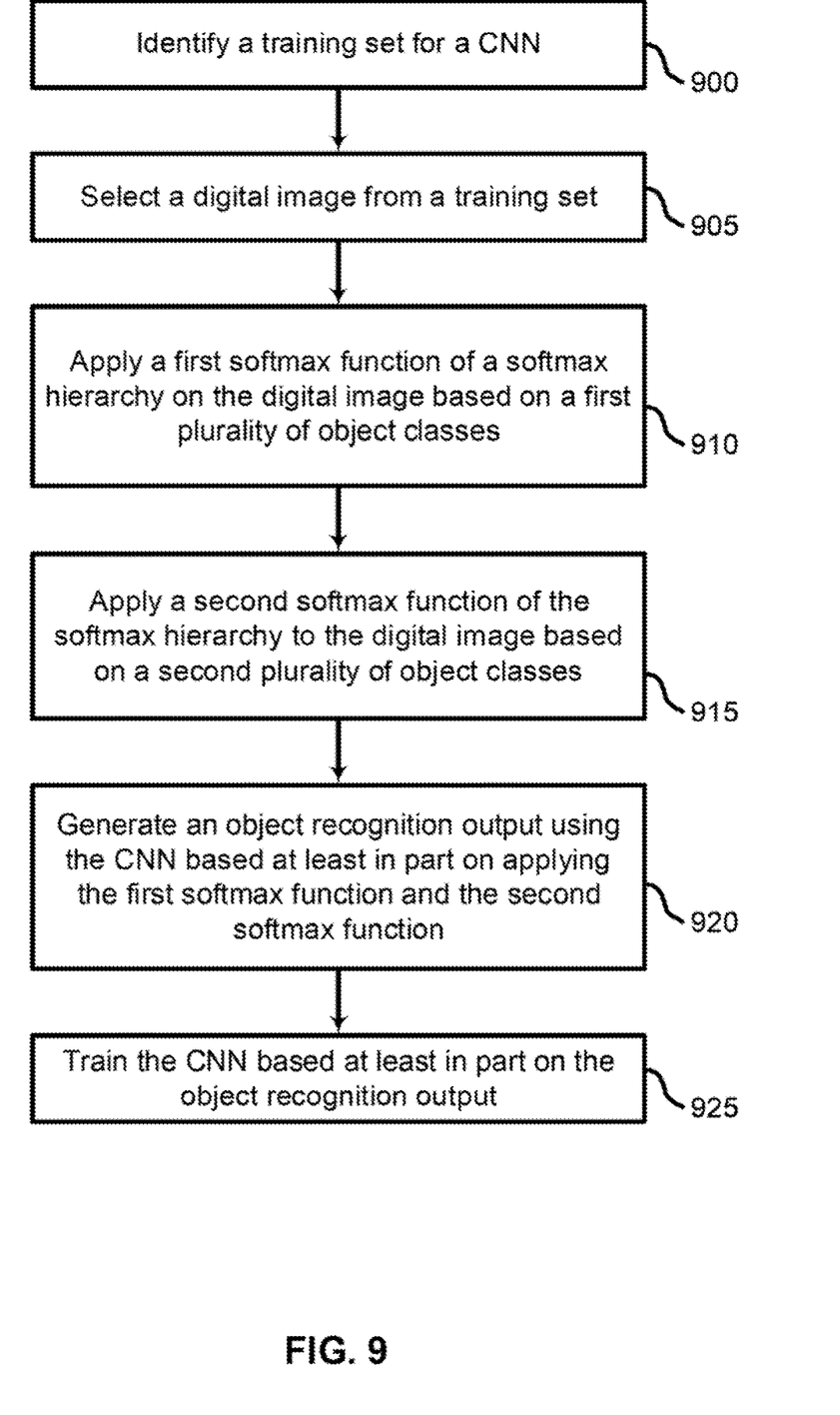

FIG. 9 shows an example of a process for object detection within a digital image using a hierarchical softmax function in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 900, the system identifies a training set for a CNN. In some cases, the operations of this step may refer to, or be performed by, a training component as described with reference to FIG. 1. In some examples, the training set may be characterized by a large number of images, a hierarchical relationship among the images (i.e., a complex set of relationships), and missing annotations.

At step 905, the system selects a digital image from a training set. In some cases, the operations of this step may refer to, or be performed by, a training component as described with reference to FIG. 1. In some cases, the digital image is selected randomly. In some examples, the image may be selected based on class-level balancing or image-level balancing (and using either offline or online balancing). Additionally random cropping and recovered missing annotations may be used during the process of or prior to selecting the digital image from the training set.

At step 910, the system applies a first softmax function of a softmax hierarchy on the digital image based on a first plurality of object classes, wherein the first plurality of object classes are children of a root node of a class hierarchy. In some cases, the operations of this step may refer to, or be performed by, a hierarchical softmax component as described with reference to FIG. 1.

At step 915, the system applies a second softmax function of the softmax hierarchy to the digital image based on a second plurality of object classes, wherein the second plurality of object classes comprise children nodes of an object class from the first plurality of object classes. In some cases, the operations of this step may refer to, or be performed by, a hierarchical softmax component as described with reference to FIG. 1.

At step 920, the system generates an object recognition output using the CNN based at least in part on applying the first softmax function and the second softmax function. In some cases, the operations of this step may refer to, or be performed by, an object detector as described with reference to FIG. 1.

At step 925, the system trains the CNN based at least in part on the object recognition output. In some cases, the operations of this step may refer to, or be performed by, a training component as described with reference to FIG. 1. For example, based on the loss function determined by applying the hierarchical softmax, a loss function may determine how and whether to adjust node weights (or filter weights) in the CNN to improve the object detection ability. Once trained, the system may be used to recognize objects in subsequently provided digital images, even if the images are not present in the training set.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for object detection, comprising:
applying a first softmax function of a softmax hierarchy to a first plurality of object classes of a digital image, wherein the first plurality of object classes are children of a root node of a class hierarchy; and wherein the softmax hierarchy includes softmax functions applied separately to corresponding levels of the class hierarchy;
applying a second softmax function of the softmax hierarchy based on a second plurality of object classes of the digital image, wherein the second plurality of object classes comprise children nodes of an object class from the first plurality of object classes; and
generating an object recognition output using a convolutional neural network (CNN) based at least in part on applying the first softmax function and the second softmax function;
wherein the object recognition output corresponds to at least one class from the class hierarchy.

2. The method of claim 1, further comprising:
applying one or more third softmax functions of the softmax hierarchy, wherein the one or more third softmax functions correspond to one or more third plurality of object classes below the second plurality of object classes in the class hierarchy.

3. The method of claim 1, further comprising:
performing an averaging on a result of the first softmax function and a result of the second softmax function, wherein the result of the first softmax function has a higher weight in the averaging function than the result of the second softmax function.

4. The method of claim 1, wherein:
the CNN comprises a loss function based on the softmax hierarchy.

5. The method of claim 1, further comprising:
identifying a training set for the CNN;
selecting the digital image from the training set, wherein the first softmax function and the second softmax function are applied based on the selection; and
training the CNN based at least in part on the object recognition output.

6. The method of claim 5, further comprising:
identifying one or more class-specific image sets from the training set;
performing a class level balancing operation on the one or more class-specific image sets to generate one or more class-balanced image sets;
sampling a first plurality of images from the one or more class-balanced image sets to perform a first training epoch;
modifying one or more sampling weights of the one or more class-balanced image sets to produce one or more modified class-balanced image sets; and
sampling a second plurality of images from the one or more modified class-balanced image sets to perform a second training epoch, wherein the digital image is selected based on sampling the first plurality of images or the second plurality of images.

7. The method of claim 5, further comprising:
identifying one or more object boxes in the digital image; and
performing a random cropping of the digital image based at least in part on the one or more identified object boxes, wherein the CNN is trained based at least in part on the random cropping.

8. The method of claim 5, further comprising:
identifying one or more missing object boxes based at least in part on the object recognition output, wherein training the CNN is based at least in part on the one or more missing object boxes.

9. The method of claim 5, further comprising:
determining that the training set comprises a complex training set based on one or more complexity factors from a set of complexity factors comprising: a label hierarchy factor, a label imbalance factor, a training set size factor, and a missing label factor, wherein the softmax hierarchy is applied based at least in part on the one or more complexity factors.

10. The method of claim 1, further comprising:
identifying an object in the digital image based on the object recognition output, wherein the object corresponds to at least one class from the class hierarchy.

11. The method of claim 1, further comprising:
displaying the digital image along with one or more object overlays based at least in part on the object recognition output.

12. An apparatus for object detection within a digital image using a hierarchical softmax function, comprising: a processor and a memory storing instructions and in electronic communication with the processor, the processor being configured to execute the instructions to:
receive an output vector from a layer of a convolutional neural network (CNN);
apply a first softmax function of a softmax hierarchy to a first subset of the values from the output vector, wherein the first subset of values corresponds to a first plurality of object classes that are children of a root node of a class hierarchy;
apply a second softmax function of the softmax hierarchy to a second subset of the values from the output vector, wherein the second subset of values corresponds to a second plurality of object classes that are children nodes of an object class from the first plurality of object classes;
apply one or more third softmax functions of the softmax hierarchy to one or more third subsets of the values from the output vector, wherein the one or more third subsets of values correspond to one or more third plurality of object classes that are below the second plurality of object classes in the class hierarchy;
produce a loss value for the CNN based at least in part on applying the first softmax function, the second softmax function, and the one or more third softmax functions; and
train the CNN based at least in part on the loss value.

13. The apparatus of claim 12, the processor being further configured to execute the instructions to:
perform an averaging on a result of the first softmax function, a result of the second softmax function and a result of the one or more third softmax functions, wherein the result of the first softmax function has a higher weight in the averaging function than the result of the second softmax function or a result of the one or more third softmax functions.

14. The apparatus of claim 12, wherein:
the CNN comprises a loss function based on the softmax hierarchy.

15. The apparatus of claim 12, the processor being further configured to execute the instructions to:
identify a training set for the CNN; and
select the digital image from the training set, wherein the first softmax function, the second softmax function, and the one or more third softmax functions are applied based on the selection.

16. The apparatus of claim 15, the processor being further configured to execute the instructions to:
identify one or more object boxes in the digital image; and
perform a random cropping of the digital image based at least in part on the one or more identified object boxes, wherein the CNN is trained based at least in part on the random cropping.

17. The apparatus of claim 15, the processor being further configured to execute the instructions to:
identify one or more missing object boxes based at least in part on the object recognition output, wherein training the CNN is based at least in part on the one or more missing object boxes.

18. A non-transitory computer readable medium storing code for object detection within a digital image using a hierarchical softmax function, the code comprising instructions executable by a processor to:
perform a class level balancing operation on one or more class-specific image sets to generate one or more class-balanced image sets;
sample a first plurality of images from the one or more class-balanced image sets to perform a first training epoch;
modify one or more sampling weights of the one or more class-balanced image sets to produce one or more modified class-balanced image sets;
sample a second plurality of images from the one or more modified class-balanced image sets to perform a second training epoch;
apply a hierarchy of softmax functions within a convolutional neural network (CNN), wherein each softmax function within the hierarchy of softmax functions corresponds to a group of labels in a class hierarchy and is applied separately to corresponding levels of the class hierarchy; and
train the CNN based at least in part on the hierarchy of softmax functions, wherein the hierarchy of softmax functions comprises a loss function of the CNN.

19. The non-transitory computer readable medium of claim 18, the code further comprising instructions executable by the processor to:
identify one or more object boxes in the digital image; and
perform a random cropping of the digital image based at least in part on the one or more identified object boxes, wherein the CNN is trained based at least in part on the random cropping.

20. The non-transitory computer readable medium of claim 18, the code further comprising instructions executable by the processor to:
identify one or more missing object boxes based at least in part on the object recognition output, wherein training the CNN is based at least in part on the one or more missing object boxes.

* * * * *